United States Patent
Bowen

(10) Patent No.: US 6,532,904 B1
(45) Date of Patent: Mar. 18, 2003

(54) HOOK AND LOOP COLLAR

(76) Inventor: Els Blok Bowen, 5325 Seascape La., Plano, TX (US) 75093

( * ) Notice: Subject to any disclaimer, the term of this patent is extended or adjusted under 35 U.S.C. 154(b) by 68 days.

(21) Appl. No.: 10/116,514

(22) Filed: Apr. 5, 2002

(51) Int. Cl.[7] ............................................. A01K 27/00
(52) U.S. Cl. ..................................... 119/865; D30/182
(58) Field of Search ................................ 119/865, 856, 119/857, 858, 860; 54/67; D30/152

(56) References Cited

U.S. PATENT DOCUMENTS

| | | | | |
|---|---|---|---|---|
| D21,344 S | * | 2/1892 | Bryant | D30/152 |
| 2,062,786 A | * | 12/1936 | Horan | |
| 3,171,409 A | * | 3/1965 | Cetrone | |
| 3,374,636 A | * | 3/1968 | Mason | |
| 3,492,675 A | * | 2/1970 | Saltiel | |
| 4,047,505 A | * | 9/1977 | McAndless | 119/106 |
| 4,440,525 A | * | 4/1984 | Perla | 405/186 |
| 4,622,957 A | * | 11/1986 | Curlee | 128/78 |
| 4,719,876 A | * | 1/1988 | Wilken | 119/106 |
| 4,900,876 A | * | 2/1990 | Bushman et al. | 119/106 |
| 4,901,674 A | * | 2/1990 | Bushman et al. | 119/106 |
| 4,917,049 A | * | 4/1990 | Peterson | 119/106 |
| 5,195,948 A | * | 3/1993 | Hill | 602/19 |
| 5,450,858 A | * | 9/1995 | Zablotsky et al. | 128/876 |
| 5,528,771 A | * | 6/1996 | Yudin | 602/19 |
| 5,581,810 A | * | 12/1996 | Yewer, Jr. | 2/44 |
| 5,628,283 A | * | 5/1997 | Huegelmeyer | 119/815 |
| 5,707,709 A | * | 1/1998 | Blake | 428/102 |
| 5,778,828 A | * | 7/1998 | Klinkhart et al. | 119/815 |
| 5,987,676 A | * | 11/1999 | Littleford et al. | 5/636 |
| 6,129,054 A | * | 10/2000 | Campbell | 119/856 |
| 6,419,652 B1 | * | 7/2002 | Slautterback | 602/19 |

* cited by examiner

Primary Examiner—Yvonne R. Abbott

(57) ABSTRACT

An adjustable collar for an animals neck, compromised of a semi-flexible material (10). The exterior side covered with loop material 14. The interior side comprising of alternate pillows and valleys 16, the valleys having sufficient flexibility to permit the collar to be rolled into the interior side which encircles the animals neck 12.

To secure the collar in place a strap of hook material 18 is used for engaging the loop material. A plurality of ventilation holes 20 passing through the collar have been added and scored lines 22 traverse to the pillows and valleys are used for trimming the collar for the custom fit of the animal.

4 Claims, 3 Drawing Sheets

HOOK AND LOOP COLLAR

BACKGROUND

1. Field of Invention

This invention relates to the protection of animals from self-mutilation due to external injuries from external causes or self-inflicted injuries.

2. Description of Prior Art

Currently, veterinarians and pet suppliers use the Elizabethan style animal collars to stop an animal from self-mutilation.

When a pet has been injured and requires medical attention or had some type of surgery an Elizabethan style animal collar is used to stop a pet from irritating the afflicted area. The Elizabethan style collar is cumbersome because the plastic design is not flexible. It is a distraction for the animal because it is formed to go around the neck and flare away from the head of the animal, which causes their peripheral vision to be distorted. The animals are not aware of how far it extends out and cannot judge the distance from other objects and themselves. This in turn frightens and confuses the animal and daily routines become very frustrating for the animal. The animals cannot eat, drink or sleep properly because it interferes with their daily activities and routines.

Inventors have created several types of collars that are not comfortable for the pet. U.S. Pat. No. RE32,219 to Garth (1986) discloses a stiff elongated band that is made of a flexible material from various plastics.

U.S. Pat. No. 3,013,530 to Zeman (1961) displays a collar that provides a large space around the neck with numerous strings attached making the collar more difficult to adjust.

U.S. Pat. No. 3,027,894 to Moore (1962) displays a cervical collar constructed from heavy strap like materials such as leather that often includes multiple metal braces.

U.S. Pat. No. 3,036,554 to F. L. Johnson (1962) displays a collar for a dog assembled with laces or staples.

U.S. Pat. No. 3,072,098 to Boemle (1963) displays a collar assembled by means of loose parts, in the form of a strip, with two u-bends attached to the collar by two staples.

U.S. Pat. No. 4,036,179 to Turner (1977) and U.S. Pat. No. 4,286,547 to Nuwbauer (1981) are body trusses, which inhibits the animal daily routines.

U.S. Pat. No. 4,476,814 to Miller (1984) is an animal pet medical collar made with resilient foam having a doughnut shape using drawstrings anchored to each end of the body.

U.S. Pat. Nos. 4,200,057 and 5,012,764 to Fick et al. (1991) describes a collar that is assembled with fasteners in the form of loops and hooks that are fastened to the overlapping ends of the collar.

U.S. Pat. No. 5,133,295 to Lippincott (1992) describes a veterinary collar for a cat comprising of two side-by-side rings sewn together with a drawstring passage. These rings are made of plastic sheet material, and gathered to form radial pleats.

U.S. Pat. Nos. 5,307,764 and 5,469,814 to Moy (1994–1995) is made of a flexible sheet of material fastened around the neck to prevent the animal from biting or licking the wound.

U.S. Pat. No. 5,628,283 to Huegelmeyer (1997) describes a neck collar for preventing animals from licking parts of their body.

U.S. Pat. No. 5,778,828 to Klinkhart et al.(1998) describes a protective pet collar having two sheets of flexible material fastened around an animal's neck. The collar has a width adjustment to accommodate different lengths of the necks for various animals. FR 2,630,297 to FR.(1989) describes a collar that has two tongues on opposite sides that hook together. A similar U.S. Pat. No. is 5,797,354 to Marschall (1996).

U.S. Pat. No. 5,797,863 to K.o slashed.hnke (1996) discloses a collapsible cervical collar with an elongated neck and a brace for chin support. DE 4,100,851 to DE. (1991) describes a collar assembled with snap fasteners.

Products that are currently on the market are "Your Pet's Recovery and Protection Collar" manufactured by 3M. "Space Age Plastic Collar" by Avian Medical Center and the "Bite Not collar" manufactured by Bite Not Products Inc. The collars inhibit the animal from engaging in their daily activities and only protect cats or dogs.

U.S. Pat. No. 6,056,711 to Domanski et al., (2000) describes a fully adjustable cervical collar than can be adjusted not only in overall length but also in height.

U.S. Pat. No. 5,628,283 to Huegelmeyer (1997) describes a collar structure having and open and closed position. The tube has a forward edge and rear edge.

U.S. Pat. No. 5,778,828 to Klinkhart (1998) describes a protective pet collar that has 2 sheets of flexible material fastened around a animals neck.

U.S. Pat. No. 6,244,222 B1 to Bowen (2001) describes an adjustable pet collar comprised of UV safe foam shaped as a cylinder with a vertical slit.

OBJECTIVES AND ADVANTAGES

The advantages of the present animal collar are as follows:

(a) Provide a closure that can allow any person to position the brace on or off with ease.
(b) Provide easy modifications that can be altered to meet the specific neck diameter and length of the animal.
(c) Provide the caregiver of the animal, easy access to apply topical medications/bandages to the injured area without fear of being bitten by the animal or having the animal lick or bite the medications/bandages.
(d) Provide time for the animals wound to heal without inducing secondary trauma
(e) Provide the animal freedom to go about daily activities without being distracted.
(f) Provide the animal with little discomfort
(g) Provide time for the animals wound to heal by inhibiting the animal to lick or bite the afflicted area.
(h) Allow the animal to climb or go down a set of stairs.
(i) Provide a weather proof, lightweight, reusable collar that does not affect mobility.
(j) Provide a softer and more flexible product, which is produced in a variety of colors.
(k) Provide ventilation pillows throughout the collar with additional holes inserted for ventilation.
(l) Provide guidelines within the collar to allow for easy cutting.
(m) Provide numbers identified within the collar to identify the appropriate neck size for the pet.
(n) Provide a collar that could be cut into multiple collars depending on neck size.
(o) Provide the pet with access to enter and exit "doggie doors".

DRAWING FIGURES

REFERENCE NUMERALS IN DRAWINGS

Figure 1A:
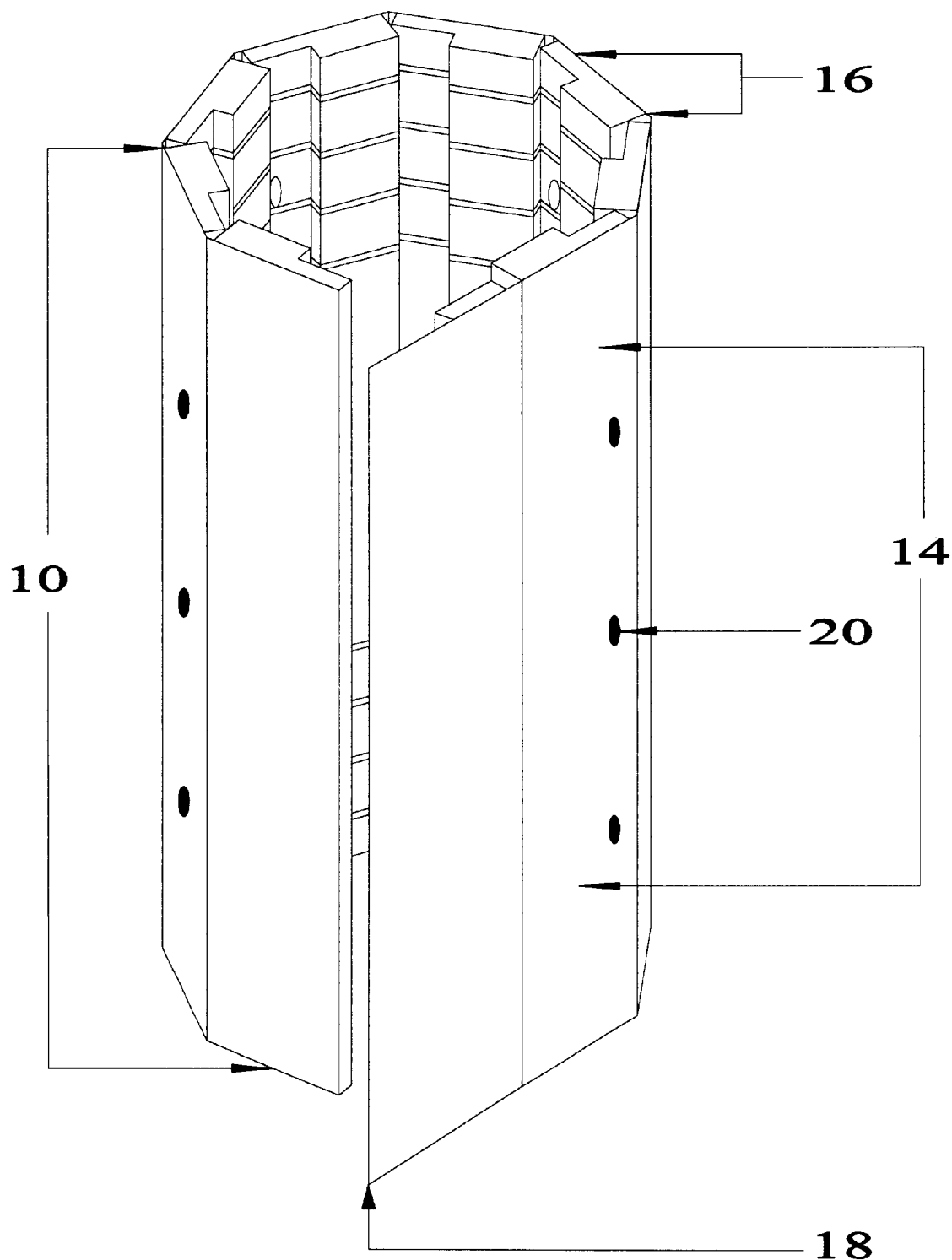
FIG. 1A Shows a side view of the collar using a semi-flexible material with alternate pillows, valleys and ventilation holes. The exterior side covered with loop material along with a strap of hook for engaging the material.

10 Semi-flexible material
12 Opening for animal's neck
14 Exterior loop material
16 Alternate pillows and valleys
18 Hook strap
20 Ventilation holes
22 Scored lines

SUMMARY

An adjustable collar for animals, compromising of an exterior side covered with loop material. The interior side comprising of alternate pillows and valleys, the valleys having sufficient flexibility to permit the collar to be rolled into the interior side which encircles the animals neck.

To secure the collar in place a strap of hook material is used for engaging the loop material. A plurality of ventilation holes passing through the collar have been added and scored lines traverse to the pillows and valleys are used for trimming the collar for the custom fit of the animal.

DESCRIPTION

FIGS. 1A–1C

Figure 1B:
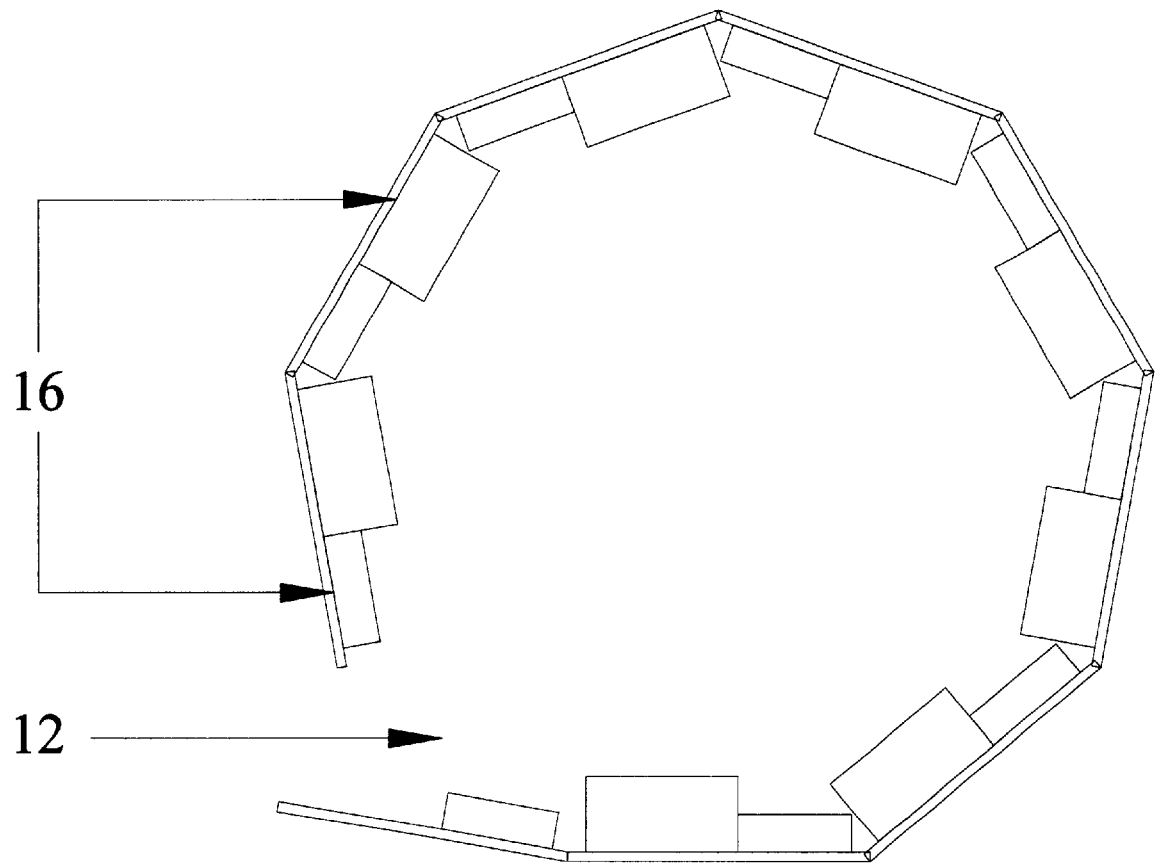
FIG. 1B Shows a semi-closed top view using a semi-flexible material with alternate pillows, valleys, and an opening for animals neck.

A typical embodiment of the present invention is illustrated in FIGS. 1A (side view), FIG. 1B (semi-closed top view) and 3C (open interior view).

FIG. 1A Shows a side view of the collar covered with loop material 14, which has been flame-laminated to the semi-flexible material 10, known as thermo-formed cross-link polyethylene foam.

The interior side of the cross-link polyethylene foam has been formed with 1 inch sized alternate pillows and valleys 16 for ventilation strips throughout the collar.

Additional ⅜ inches ventilations holes 20 have been bored and spaced 2½ inches in width and 4 inches in length.

To secure collar in place a 2×12 inch hook strap 18 has been vertically sewn in place on ½ inch end of the cross-link polyethylene material.

FIG. 1B Shows a semi-closed top view using a semi-flexible material with alternate pillows, valleys, 16 and an opening for animals neck 12.

Figure 1C:
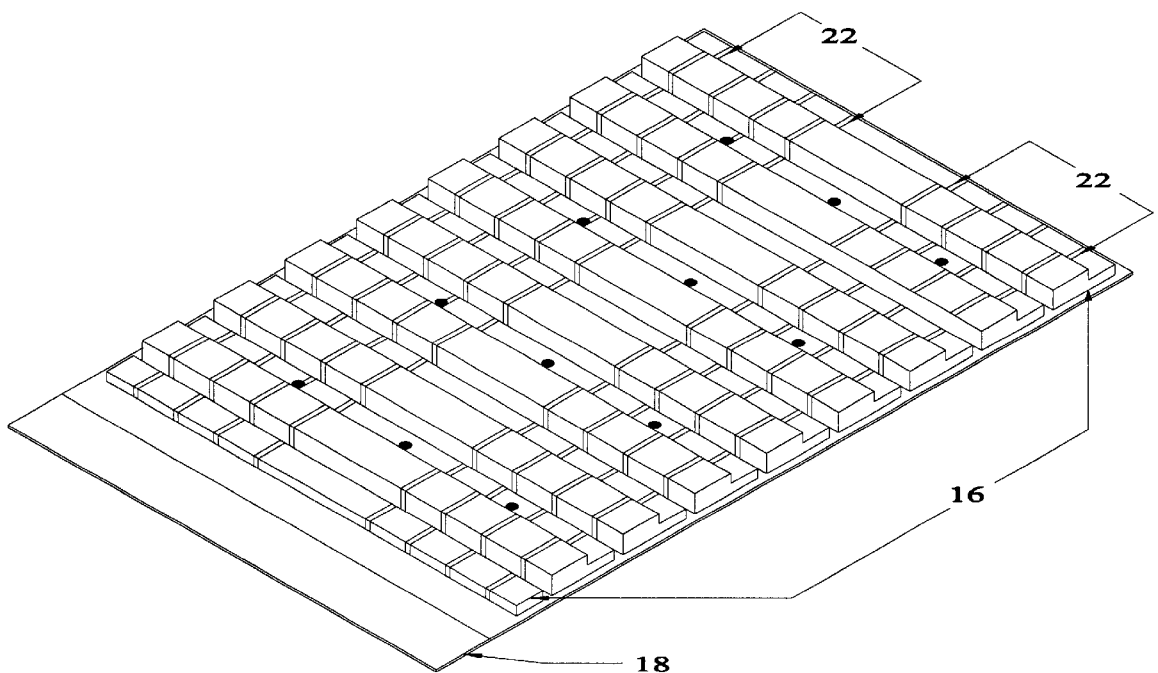
FIG. 1C Shows an interior side of the collar with alternate pillows, valleys and ventilation holes with transverse scored lines.

FIG. 1C Shows an interior side of the collar with alternate pillows, valleys 16 and ventilation holes 20 with 8 defined transverse scored lines 22 spaced 1 inch apart from each end of the collar.

To secure collar in place a 2×12 inch hook strap 18 has been vertically sewn in place on ½ inch end of the cross-link polyethylene material.

OPERATION

FIGS. 1A–3C

The manner of using this collar is to cut along the scored lines to desired neck size. Place collar around animal's neck and secure the collar by attaching the hook to the loop on the opposite side of the collar adjust according to neck size. To allow adequate movement for breathing, eating and ventilation place one finger between the animal's neck and adjustable collar.

To remove collar, lift hook strap and remove collar from animal.

CONCLUSION, RAMIFICATIONS, AND SCOPE

This animal collar can be easily used. It can be removed just as easily as placed on the animal without any undue harm to the animal or the collar.

The production of this collar is made in a variety of colors without requiring the manufacturer to use a separate facility. The collar is soft, pliable to avoid any additional harm to the animal. The collar is also weatherproof, UV safe, reusable and hand washable without hindering the effectiveness of the collar.

Permits the animal's wound to heal because the animal cannot access the wound.

Permits the animal to eat, drink and go on with its daily activities without interference.

Permits the animal to have a healthy attitude by not feeling self-conscious.

The description above includes numerous specifications. These specifications simply outline some of the current designs of the invention. They should not be seen as restrictions. For example, the collar could be made into various sizes. The hook strap could be wider or have multiple straps added to the collar depending on the size of the animal.

Labels with name, address, city, state, and phone number could be added. Physical appearance could be altered by adding rhinestones, bobbles etc. for cosmetic features.

What is claimed is:

1. An adjustable collar for animals comprising:
   (a) An exterior side; and,
   (b) An interior side; the interior side further comprising alternate pillows and valleys;
      the valleys having sufficient flexibility to permit the collar to be rolled into the interior side to encircle an animals neck;
   (c) further comprising scored lines transverse to the pillows and valleys for trimming the collar.

2. The collar of claim 1 where the exterior side is covered with loop material, and the collar further comprises a strap of hook material for engaging the loop material.

3. The collar of claim 1 further comprising ventilation holes passing through the collar.

4. An adjustable collar for animals, the collar comprising:
   (a) An exterior side; the exterior side covered with loop material, and
   (b) An interior side further comprising alternate pillows and valleys; the valleys having sufficient flexibility to permit the collar to be rolled into the interior side to encircle and animals neck;
   (c) A strap of hook material for engaging the loop material;
   (d) A plurality of ventilation holes passing through the collar; and,
   (e) Scored lines transverse to the pillows and valleys for trimming the collar.

* * * * *